Nov. 5, 1929. E. P. JONES 1,734,214
MOTOR CAR BODY
Filed Nov. 29, 1927 3 Sheets-Sheet 3

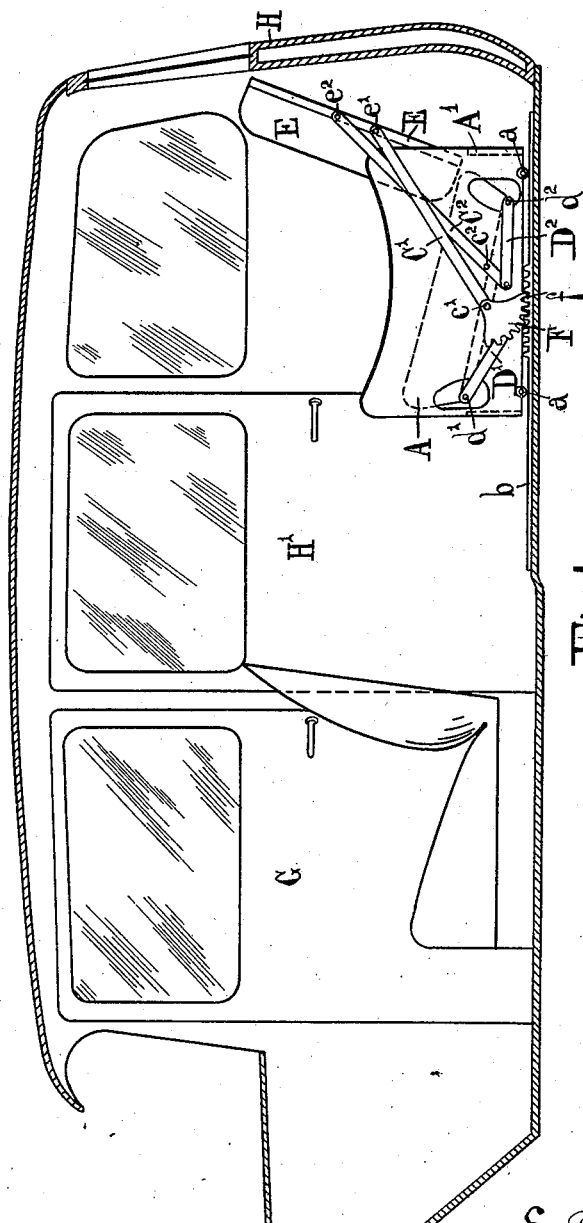

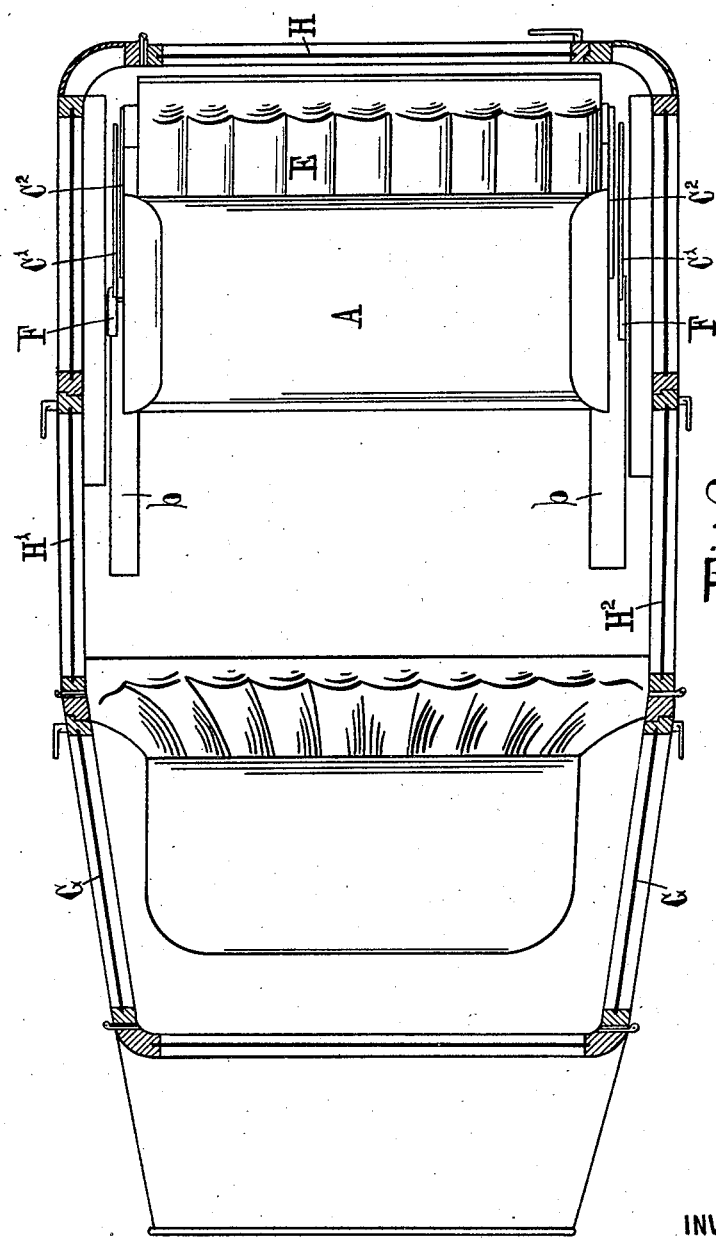

Patented Nov. 5, 1929

1,734,214

UNITED STATES PATENT OFFICE

EDWARD PETER JONES, OF CHESTER, ENGLAND

MOTOR-CAR BODY

Application filed November 29, 1927, Serial No. 236,466, and in Great Britain August 25, 1927.

This invention relates to improvements in motor car bodies of the type having a front seat facing forward, a rear seat facing rearward fixed back to back with the front seat and a door at the back of the body from which to enter the rear seats.

The object of the improvements is to retain the advantages of that construction and at the same time provide for the use of a rear seat facing in a forward direction.

According to the invention the rear seat is constructed so that it may be placed to face either to the front or to the rear, entrance doors are placed at one or both sides and an entrance door is also placed at the rear so that access may be had to the rear seat in whichever position it may be placed.

The invention will be described with reference to the accompanying drawings:—

Fig. 1. is a transverse section through a motor car body showing the arrangement of the seats with the rear seat facing frontwards.

Fig. 2. is a sectional plan of same.

Figure 3:
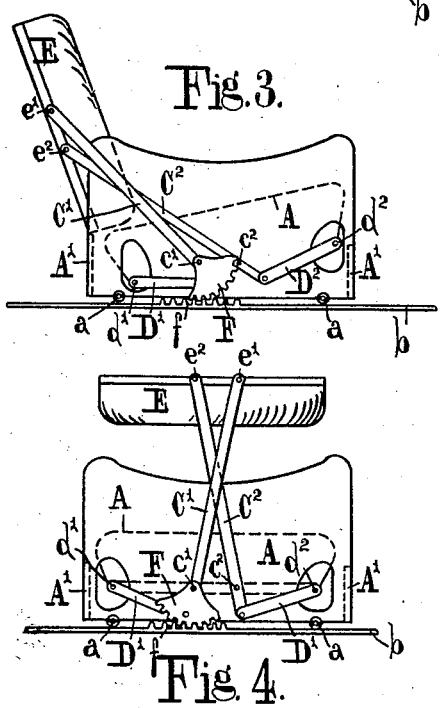

Fig. 3. is a side view of the rear seat showing it facing rearwards.

Figure 4:
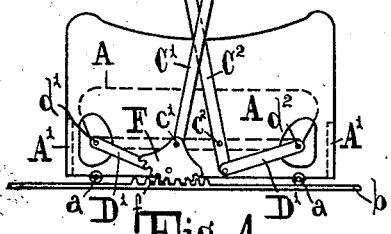

Fig. 4. is a side view of the rear seat showing the back rest in the mid position.

Figure 5:
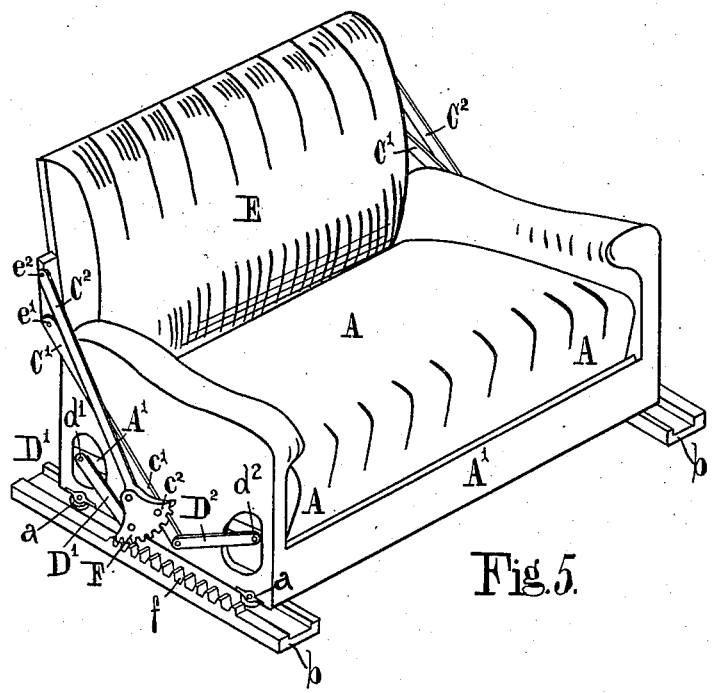

Fig. 5. is a perspective view of the rear seat.

Figure 6:
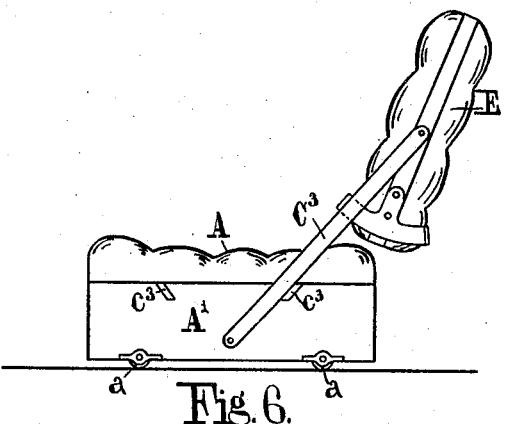

Fig. 6. is a side view of a modified construction of rear seat.

The rear seat A is carried in a frame $A^1$ provided with runners $a$ adapted to run on slides $b$ on the floor of the vehicle so that the seat can be moved from the position facing rearwards, the position shown in Fig 3 to the position facing frontwards, the position shown in Fig. 1.

The pins or studs $c^1$, $c^2$ are carried on each side of the frame $A^1$ and on each of these studs or pins a link $C^1$ or $C^2$ is pivotally mounted the link $C^1$ being mounted on the stud $c^1$ and the link $C^2$ on the stud $c^2$. The links $C^1$ and $C^2$ extend below the level of the seat A and each is pivotally connected at its lower end to a second link $D^1$ or $D^2$. The other end of the link $D^1$ is pivotally connected at $d^1$ to the lower corner of one edge of the seat A and the link $D^2$ is similarly connected at $d^2$ to the other corner of the seat A so that the seat A is carried by the studs or pins $d^1$, $d^2$ through the lower ends of the four links $C^1$ and $C^2$ and the four links $D^1$ and $D^2$.

The back rest E is pivotally connected to the upper ends of the links $C^1$ and $C^2$ at $e^1$ and $e^2$, the links $C^1$ and $C^2$ crossing each other so that the back rest E can be swung over from the position shown in Fig. 1 to that shown in Fig. 3 when it is desired to reverse the position of the seat A from facing frontwards to facing rearwards. The movement of the back rest E also causes the inclination of the seat A to be altered so that the latter will always be inclined towards the back rest E at whichever edge of the seat the latter may be.

The bottom end of one of the links $C^1$, $C^2$ (the link $C^1$ in the drawings) may be provided with a toothed quadrant F engaging with a rack $f$ adjacent to one of the slides $b$ on which the frame $A^1$ of the seat slides so that the movement of the seat on the slides will also cause the back rest to swing over from one position to the other, or the swinging over of the back rest will cause the seat to slide correspondingly. Instead of a quadrant, the same movement may be obtained by a tooth or teeth on the end of the quadrant engaging with a single projection on the floor of the car.

Instead of the seat being arranged as described above, the back rest E may be pivotally mounted on the end of a single link $C^3$ as shown in Fig. 6 so that it may swing over from one edge of the seat to the other, stops $c^3$ being provided to limit the movement. In such arrangement both sides of the back rest would be upholstered as one side would form the back in one position and the other side in the other position.

Or rear seats may be made in pairs and mounted on swivel pins or turntables or made movable so that they may be turned in either direction or removed and replaced as required.

In bodies which have no division between the driver's compartment and the rear compartment, the front seat, whether it be one seat to accommodate the driver and passenger, or in the form of two separate single seats, could be built on similar lines enabling the seat to be reversed for picnicing purposes or such like, and if the front seat were in the form of two separate seats the passenger seat could be reversed and the passenger sit vis-à-vis with those on the back seat which would often be an advantage. Both these points would be equally an advantage in salon or open touring car bodies.

In any of the different constructions of the rear seat springs, catches, bolts or other locking devices may be employed to maintain the seat in the required position.

The body is provided with the usual one or two doors G giving access to the front seat and with three doors H, H¹, H² giving access to the rear seat. One door H is arranged at the rear to give access to the rear seat A when the latter is in the position facing rearwards (Fig. 3) and the two doors H¹ and H² are arranged one at either side—to give access to the rear seat A when the latter is in the reversed position facing frontwards (Fig. 1).

Catches may be applied to the rear or other doors to lock them or prevent them being opened when not required to give access to the seats.

A motor car body having the seats arranged in accordance with this invention has all the advantages of both a car of ordinary construction and a car of the observation type such as described above since the rear seat can be arranged facing forward or facing rearward as desired by the passenger or passengers occupying the rear seat.

What I claim as my invention and desire to protect by Letters Patent is:—

1. In a motor car body, the combination with a front seat, of a rear seat, a back rest for the rear seat, a frame supporting the rear seat, link members connecting the rear seat to the frame and supporting the back rest, so that the latter can be swung over to reverse the position of the rear seat, slides on which the frame is mounted, a toothed device on the end of one of the links, a projecting device on the floor of the car, adapted to be engaged by the toothed device, so that a sliding movement of the seat will actuate the links to reverse the back rest, a door at the rear of the body to give access to the rear seat, when it is facing rearward, and doors at the sides of the body to give access to the rear seat, when it is facing forward.

2. In a motor car body, the combination with a front seat, of a rear seat, a back rest for the rear seat, a frame supporting the rear seat, link members connecting the rear seat to the frame and supporting the back rest, so that the latter may be swung over to reverse the position of the rear seat, slides on which the frame is mounted, a toothed device on the end of one of the links, a projecting device on the floor of the car, adapted to be engaged by the toothed device, so that a sliding movement of the seat will reverse the back rest and also a reverse movement of the back rest will slide the seat, a door at the rear of the body to give access to the rear seat, when it is facing rearward, and doors at the sides of the body to give access to the rear seat, when it is facing forward.

In testimony whereof I have hereunto set my hand.

E. PETER JONES.